2,842,601

FLUORINATED HEMIACETALS

Neal O. Brace, Wilmington, Del., assignor to E. I. du Pont de Nemours and Company, Wilmington, Del., a corporation of Delaware No Drawing. Application August 14, 1957
Serial No. 678,042

3 Claims. (Cl. 260—615)

This invention relates to the preparation of omega-hydroperfluoro aliphatic aldehyde-1,1-omega-trihydroperfluoro aliphatic hemiacetals as new compounds and to a simple and economical method for their preparation.

The compounds of the present invention are stable compounds under ordinary conditions but can be readily converted to the corresponding aldehydes merely by heating even in the absence of catalysts. This makes them particularly valuable as a convenient storage source of aldehydes. The hemiacetals of this series can also be chlorinated to produce the omega-chloro-omega'-hydroperfluoro aliphatic hydrocarbons which are known to be useful as intermediates in the preparation of surface active agents and treating agents for paper, textiles and the like, and highly fluorinated compounds useful as heat transfer media and the like as more particularly described in U. S. Patents 2,790,815 and 2,551,573. It is therefore an object of the present invention to produce new and useful intermediate omega-hydroperfluoro aliphatic compounds which are useful as intermediates in the preparation of other valuable chemicals.

The compounds of the present invention have the general formula

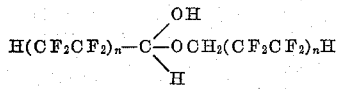

in which each $n$ is an integer from 1 to 12. These compounds may be prepared by the direct photochlorination of alcohols having the general formula

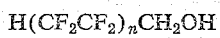

in which $n$ has the same meaning as given above. The chlorination of the fluorine-containing alcohols is carried out at temperatures of from 0° C. to 80° C. using from 0.1 to 0.5 mole of chlorine per mole of alcohol. The alcohols particularly useful as starting materials in the present invention are more particularly disclosed in U. S. Patent 2,559,628 of July 10, 1951. For best results, particularly where the resulting hemiacetals are to be converted to aldehydes, the starting fluorinated alcohols should be thoroughly dry.

Any general source of radiation giving off actinic rays can be used in the chlorination. Because of improved reaction efficiency, sources relatively high in ultraviolet light are preferred. Accordingly, mercury vapor arc lamps will be used since they afford a relatively intense source of the preferred ultraviolet light.

The chlorine will be passed into the reaction zone containing the fluorinated alcohol at such a rate that essentially all of the chlorine will react as rapidly as it is absorbed so that no free chlorine will remain in solution. Ordinarily, the theoretical quantity of chlorine will be used, namely, 0.5 mole of chlorine per mole of fluorine-containing alcohol, although lesser amounts may be employed with the results that there remains in the resulting product some of the unreacted alcohol. This is not detrimental where the product is converted to the aldehyde since on distillation it can be readily separated therefrom. To minimize side reactions, it is preferred that somewhat less than the theoretical amounts of chlorine be employed.

The chlorination can be carried out at temperatures ranging from about 0° C. to 80° C., the temperature varying with the relative activity and the melting points of the alcohol reactant. The preferred temperatures are from 0° to 40° C. Below 0° the reaction goes very slowly, while at higher temperatures, the yield of the hemiacetal is decreased due to side reactions.

In carrying out the photochlorination, the fluoro alcohols should be in liquid form. Where the alcohols employed are solids, that is, have a melting point greater than the temperature used in the reaction, they should be dissolved in a solvent which is inert to chlorine under the conditions of the reaction. Although not inert, the lower fluorine-containing alcohols may of course be employed as solvents for the higher alcohols in which case an oxidation with chlorine a mixture of hemiacetals, in which $n$ may be the same or different integers, is obtained. This mixture may be separated after conversion to the aldehyde or other reaction product. It is of course apparent that the solvent employed should have a boiling point higher than that of the temperature at which the reaction is carried out. Carbon tetrachloride and the trichlorotrifluoroethanes are suitable solvents in which to carry out this reaction. It has been found, however, that higher yields of the hemiacetals from the high molecular weight fluoro alcohols are obtained when the lower molecular weight 1,1-omega-trihydroperfluoroalkanol is employed as the solvent.

The hemiacetals produced by the photochlorination of the corresponding 1,1-omega-trihydroperfluoroalkanols may also be prepared by the direct reaction of 1,1-omega-trihydroperfluoroalkanol with omega-hydroperfluoro aliphatic aldehydes. However, since this requires the previous preparation of the aldehydes, the process of the present invention, wherein the fluoroalkanols are photochlorinated, is the most economical and preferred process. The direct reaction of the fluoroalkanols with the fluoro aliphatic aldehydes is however hereinafter exemplified to further identify products of this invention.

The hemiacetals obtained by the process of this invention, except of very high molecular weight which are solids, are colorless liquids. The hemiacetals have a distinct odor less pungent than the corresponding aldehyde. They possess indices of refraction considerably higher than either the corresponding alcohol or aldehyde portion. The subject hemiacetals possess infrared spectra with no carbonyl band but a strong hydroxyl band having about 50% of the intensity of the hydroxyl band of the alcohol employed. There are bands distinguishing the hemiacetals from the starting alkanols. For example, in the case of

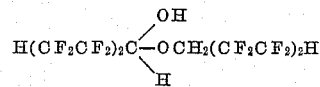

there is a strong band at 12.65 and 12.75 microns that is absent in $H(CF_2CF_2)_2CH_2OH$. The hemiacetals undergo thermal decomposition below their boiling points to yield the corresponding omega-hydroperfluoro aliphatic aldehyde.

The hemiacetals also react at their hydroxyl group to give ethers of the hemiacetals (also referred to as mixed acetals). These are formed by alkylation of the hydroxyl group on heating the hemiacetals with alkylating agents such as dimethyl sulfate, ethyl iodide, diethyl sulfate, propyl iodide, propyl bromide, isopropyl iodide, n-butyl iodide, and tert.-butyl chloride.

These compounds of this invention are particularly useful in providing a convenient and stable form for the storage of corresponding omega-hydroperfluoro aliphatic aldehyde compounds in the form of an addition compound which has no offensive odor.

The aldehydes resulting from the acetals of this invention are extremely reactive and are very sensitive to moisture forming the corresponding monohydrates (aldehydrols) almost instantaneously therewith. Moreover, the aldehydes tend to decompose with the loss of carbon monoxide on standing. For these reasons it is difficult to store the omega-hydroperfluoro aliphatic aldehydes as such. The aldehyde can easily be generated from the hemiacetal by simple thermal decomposition. This thermal decomposition can be accomplished without the use of catalysts or molecular proportions of strong dehydrating agents.

The following examples are given to illustrate the invention. The parts used are by weight unless otherwise specified.

*Example 1*

A closed reaction vessel comprising a cylindrical tube 12 x 2½ inches fitted with a sintered glass disc at the bottom for admitting chlorine gas, and an outlet at the top is utilized for chlorination of 1,1,5-trihydroperfluoropentan-1-ol. It contained an internal coil of quartz tubing in which a mercury vapor glow discharge is generated. The temperature of the reaction mixture is controlled by immersion of the vessel in a liquid bath. 360 grams (1.5 moles) of 1,1,5-trihydroperfluoropentan-1-ol (B. P. 105° C./200 mm.; $n_D^{25}$ 1.3162) are placed in the reaction vessel which is immersed in a water bath at 20° C. Chlorine gas is fed in at a rate of about 9 grams/hour. The internal temperature of the reaction mass reaches about 31° C. The hydrogen chloride which evolves from the reaction is conducted through a trap immersed in a —80° C. cooled bath and finally absorbed in water. (This acid solution may be titrated with standard alkali to follow the course of the reaction.) The total amount of chlorine utilized is 50 grams (0.7 mole) which corresponds to 0.454 mole of chlorine/mole of alcohol. The reaction is carried out over a period of 6 hours. At the end of each hour a sample of about 2 grams is removed without admitting air and analyzed by infrared spectra. All of the spectra show a complete absence of the carbonyl (aldehyde) band at 5.65 microns. In the region of 10 to 14 microns the spectra are different from that of pure 1,1,5-trihydroperfluoropentan-1-ol; and contain a band at 12.65–12.75 microns which is missing in the spectrum of the alcohol.

The six samples of hemiacetal in alcohol are combined to one weighing 13.0 grams. The resulting hemiacetal in the fluoro/alcohol is then treated with 2.2 grams (0.018 mole) of dimethyl sulfate and 2.42 grams of anhydrous potassium carbonate at 60° C. with stirring for 4 hours. After standing for 24 hours, ice is added and the reaction mass is stirred an additional half hour. The product is extracted with methylene chloride, dried over a mixture of magnesium sulfate and calcium sulfate, and distilled. 3.2 grams of the methyl ether of 5-hydroperfluorovaleraldehyde-1,5 - trihydroperfluoropentyl hemiacetal (B. P. 123° C./27 mm. and $n_D^{25}$ 1.3241) are obtained. The infrared spectrum of the mixed acetal shows the absence of both carbonyl and hydroxyl bands. Elemental analysis yields 27.0% carbon and 64.7% fluorine; calculated values for

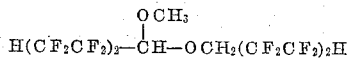

are 27.7% carbon and 63.8% fluorine.

The major portion of the chlorination mixture (hemiacetal in alcohol) is distilled at 145–178° C. at atmospheric pressure. The hemiacetal thermally decomposes under these conditions and yields 108 grams of 5-hydroperfluorovaleraldehyde (B. P. 83–87° C.; $n_D^{25}$ 1.2965), which analyzes 26.1% carbon and 65.9% fluorine.

Calculated values for $C_5H_3F_9O$ are 26.1% carbon and 66.0% fluorine. Its 2,4-dinitrophenylhydrazone derivative melts at 96° C. and analyzes 31.7% carbon and 13.7% nitrogen; $C_{11}H_6F_8N_4O_4$ requires 32.2% carbon and 13.7% nitrogen.

*Example 2*

50.0 grams (0.215 mole) of 1,1,5-trihydroperfluoropentan-1-ol and 20.7 grams (0.15 mole) of potassium carbonate are stirred under an atmosphere of nitrogen gas. 23.0 grams (0.1 mole) of 5-hydroperfluorovaleraldehyde are added in two portions. The temperature rises to 38° C. as the hemiacetal, possessing an index of refraction of 1.3253, forms. Dimethyl sulfate, 18.9 grams (0.15 mole), is added at 36° C. The reaction mixture is stirred for 2 hours at 50° C. after standing overnight. The resulting slurry is poured over 210 grams of ice and water. 45 grams of carbon tetrachloride are added, the mixture stirred 2 hours, and then allowed to separate. Two oily layers and an aqueous one are formed. The oily layers are dried over a mixture of Drierite and magnesium sulfate and then distilled. 20.7 grams (44% yield) of the methyl ether of 5-hydroperfluorovaleraldehyde-1,1,5-trihydroperfluoropentyl hemiacetal (B. P. 123° C./27 mm. and $n_D^{25}$ 1.3347) are obtained. Elemental analysis yields 28.1% carbon and 63.9% fluorine; calculated values for $C_{11}H_8F_{16}O_2$ are 27.7% carbon and 63.8% fluorine. The infrared spectrum of this compound is substantially the same curve as that of the methyl ether of the hemiacetal formed in Example 1.

*Example 3*

98.6 grams (0.3 mole) of 1,1,7-trihydroperfluoroheptan-1-ol (B. P. 130°C./200 mm.; $n_D^{25}$ 1.3162) are placed in the reaction vessel described in Example 1. The vessel is immersed in a water bath at 10° C. Chlorine gas is fed in for a period of 3½ hours at such a rate that 0.3 mole of chlorine/mole of alcohol is reacted. The resulting hemiacetal in the fluoro alcohol is then treated with 17.0 grams (0.14 mole) of dimethyl sulfate and 18.6 grams of anhydrous potassium carbonate at 60° C. with stirring for 1 hour. After the addition of ice, the product is extracted with methylene chloride, dried over magnesium sulfate, and distilled. 16 grams of the methyl ether of 7-hydroperfluoroheptan-1-al-1,1,7-trihydroperfluoroheptyl hemiacetal (B. P. 144° C./10 mm., an index of refraction of $n_D^{25}$ 1.3221, and an elemental analysis of 26.3% C., 1.6% H and 67.2% F.) are obtained. The infrared spectrum of the mixed acetal shows the absence of both carbonyl and hydroxyl bands.

*Example 4*

252 grams (2.0 moles) of 1,1,3-trihydroperfluoropropan-1-ol are mixed with 89.0 grams (0.167 mole) of 1,1,11-trihydroperfluoroundecan-1-ol (M. P. 97° C.) forming a mixture which is liquid at 39° C. At this temperature chlorine is fed in as described in Example 1 at such a rate that in 5 hours, 0.5 mole of chlorine per mole of alcohol is reacted. The resulting liquid reaction mass contains the mixture of hemiacetals from both alcohols.

Distillation under reduced pressure of the mixture of hemiacetals yields the following:

(1) 45.2 grams of 3-hydroperfluoropropion aldehyde which collects in the —80° C. trap.

(2) 184.4 grams of recovered 1,1,3-trihydroperfluoropropan-1-ol, B. P. 61–73° C./200 mm.

(3) 9.0 grams of 11-hydroperfluoroundecan-1-al, B. P. 65–87° C./10 mm.

(4) 65.8 grams of recovered 1,1,11-trihydroperfluoroundecan-1-ol, B. P. 103–119° C./10 mm.

The 3-hydroperfluoropropionaldehyde from (1) on redistillation boils at 36–36.8° C. and possesses an $n_D^{25}$ 1.285. A 2,4-dinitrophenylhydrazone derivative prepared from it melts at 126–127° C., and yields an elemental analysis of 17.9% nitrogen; $C_9H_6F_4N_4O_4$ requires 18.0% nitrogen. The 11-hydroperfluoroundecan-1-al from (3) yields a 2,4-dinitrophenylhydrazone derivative melting at 145.8–146.2° C. and analyzes 28.9% carbon, and 8.2% nitrogen. Calculated values for $C_{17}H_6F_{10}N_4O_4$ are 28.8% carbon and 7.9% nitrogen.

The following alcohols are chlorinated according to the process described in Example 1 except as noted:

| Ex. | $H(CF_2CF_2)_nCH_2OH$ | Temp. of Reaction, °C. | Moles $Cl_2$/mole alcohol | Percent Conversion to Hemiacetal |
|---|---|---|---|---|
| 5 | n=3 | 40 | 0.25 | 34 |
| 6 | n=3 | 20-26 | 0.35 | 58 |
| 7 | n=4 | ¹ 55 | 0.3 | 46 |

¹ 40 parts of the alcohol in 60 parts of carbon tetrachloride as inert solvent, to give a liquid reaction medium.

Distillation of the hemiacetal from n=3 (in each case) yields 7-hydroperfluoroheptan-1-al, B. P. 125.5° C., $n_D^{25}$ 1.2983, which analyzes 25.6% carbon, 70.2% fluorine; calculated values for $C_7H_2F_{12}O$ are 25.4% carbon, 69.1% fluorine. Its 2,4-dinitrophenylhydrazone derivative melts at 80° C. and analyzes 30.6% carbon and 11.7% nitrogen; calculated values for $C_{13}H_6F_{12}N_4O_4$ are 30.6% carbon and 11.0% nitrogen. Distillation of the hemiacetal from n=4 yields 9-hydroperfluorononan-1-al, B. P. 120° C./200 mm., $n_D^{25}$ 1.3039. Its 2,4-dinitrophenylhydrazone derivatives melts at 124.5° C. and analyzes 9.0% nitrogen; $C_{15}H_6F_{16}N_4O_4$ requires 9.2% nitrogen.

The following hemiacetals are prepared by adding 1 mole of aldehyde to 1 mole of alcohol and slowly bubbling hydrogen chloride into the liquid mixture to catalytically speed the reaction. The reactions are exothermic showing a temperature rise in the first few minutes of the reaction. The indices of refraction of the resulting hemiacetals are measured and are shown in the table below.

| Ex. | Hemiacetal | Aldehyde | Alcohol | Hemiacetal |
|---|---|---|---|---|
| 8 | $H(CF_2CF_2)-\overset{OH}{\underset{|}{C}H}-OCH_2(CF_2CF_2)H$ | 1.2965 | 1.3192 | 1.3270 |
| 9 | $H(CF_2CF_2)_3-\overset{OH}{\underset{|}{C}H}-OCH_2(CF_2CF_2)_2H$ | 1.2980 | 1.3162 | 1.3219 |
| 10 | $H(CF_2CF_2)_2-\overset{OH}{\underset{|}{C}H}-OCH_2(CF_2CF_2)H$ | 1.2980 | 1.3192 | 1.3230 |
| 11 | $H(CF_2CF_2)-\overset{OH}{\underset{|}{C}H}-OCH_2(CF_2CF_2)_3H$ | 1.2965 | 1.3162 | 1.3243 |

(Indices of Refraction ($n_D^{25}$))

These hemiacetals are colorless liquids. The refractive index of each hemiacetal is higher than that of either the reactant aldehyde or alcohol. The infrared spectra of these hemiacetals show them to be the same as the corresponding hemiacetals prepared by the chlorination process described in Example 1. The spectra show: (a) the disappearance of the aldehyde carbonyl band, (b) the presence of an hydroxyl band at 2.95 microns which is weaker in intensity than the reactant alcohol hydroxyl band, and (c) characteristic bands in the 10–14 micron region.

I claim:

1. A process for preparing omega-hydroperfluoro aliphatic aldehyde-1,1-omega-trihydroperfluoro aliphatic hemiacetals of the formula

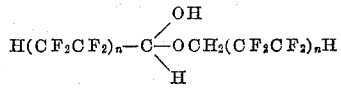

in which each n is an integer from 1 to 12, which comprises photochlorinating alcohols of the general formula $H(CF_2CF_2)_nCH_2OH$ in which n has the same meaning as given above at temperatures of from 0° to 80° C. using from 0.1 to 0.5 mole of chlorine per mole of alcohol to be reacted, the chlorine being added at such a rate that substantially all of the chlorine reacts as rapidly as it is absorbed by the solution.

2. A process for preparing omega-hydroperfluoro aliphatic aldehyde-1,1-omega-trihydroperfluoro aliphatic hemiacetals of the formula

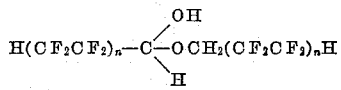

in which each n is an integer from 1 to 12, which comprises photochlorinating alcohols of the general formula $H(CF_2CF_2)_nCH_2OH$ in which n has the same meaning as given above at temperatures of from 0° to 40° C. using from 0.1 to somewhat less than the theoretical quantity of chlorine required to convert the alcohol to the hemiacetal, the chlorine being added at such a rate that substantially all of the chlorine reacts as rapidly as it is absorbed by the solution.

3. The hemiacetals of the general formula

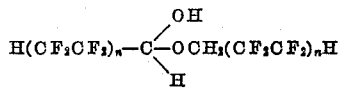

in which each n is an integer from 1 to 12.

References Cited in the file of this patent

UNITED STATES PATENTS 2,681,370   Husted et al. _____ June 15, 1954

OTHER REFERENCES

McBee et al.: J. A. C. S., vol. 75 (1953), pp. 1609–1610.